United States Patent
Askew et al.

(10) Patent No.: US 12,421,050 B1
(45) Date of Patent: Sep. 23, 2025

(54) POWERED TRANSPORT FOR TELESCOPING GRAVITY CONVEYOR

(71) Applicant: FAST Global Solutions, Inc., Glenwood, MN (US)

(72) Inventors: Colin Askew, Alexandria, MN (US); Jason Hoyt, Alexandria, MN (US); Jared Spindler, Glenwood, MN (US); James Glade, Alexandria, MN (US); Daniel Forbrook, Alexandria, MN (US)

(73) Assignee: FAST Global Solutions, Inc., Glenwood, MN (US)

( * ) Notice: Subject to any disclaimer, the term of this patent is extended or adjusted under 35 U.S.C. 154(b) by 149 days.

(21) Appl. No.: 18/208,744

(22) Filed: Jun. 12, 2023

Related U.S. Application Data

(60) Provisional application No. 63/350,926, filed on Jun. 10, 2022.

(51) Int. Cl.
*B65G 39/12* (2006.01)
*B65G 67/20* (2006.01)

(52) U.S. Cl.
CPC ............ *B65G 39/12* (2013.01); *B65G 67/20* (2013.01); *B65G 2201/0235* (2013.01)

(58) Field of Classification Search
None
See application file for complete search history.

(56) References Cited

U.S. PATENT DOCUMENTS

| | | | | |
|---|---|---|---|---|
| 3,780,843 | A * | 12/1973 | McGovern, Jr. ....... | B65G 21/14 193/35 TE |
| 5,636,728 | A * | 6/1997 | Best ..................... | B65G 13/12 198/782 |
| 5,718,325 | A * | 2/1998 | Doster .................. | B65G 43/08 414/508 |
| 7,370,753 | B2 * | 5/2008 | Yang .................... | B65G 67/08 198/588 |
| 7,395,918 | B2 * | 7/2008 | Thompson ........... | B65G 21/14 198/594 |
| 7,416,075 | B2 * | 8/2008 | Haustein .............. | B65G 13/12 198/588 |
| 10,005,627 | B2 | 6/2018 | Girtman et al. | |
| 10,230,315 | B2 * | 3/2019 | Ramezani ............ | B65G 21/14 |
| 10,815,075 | B2 * | 10/2020 | Bastian, II ........... | B65G 47/914 |
| 11,518,630 | B2 * | 12/2022 | Zoghzoghy .......... | B65G 41/003 |
| 2014/0326580 | A1 | 11/2014 | Carpenter et al. | |
| 2021/0122589 | A1 | 4/2021 | Griggs | |
| 2023/0365357 | A1 * | 11/2023 | Campbell ............ | B65G 41/008 |
| 2024/0286843 | A1 | 8/2024 | Baron, III et al. | |

FOREIGN PATENT DOCUMENTS

| | | |
|---|---|---|
| CN | 107879135 A | 4/2018 |
| CN | 209396606 U | 9/2019 |
| ES | 2478517 T3 | 7/2014 |
| WO | WO2010136789 A1 | 12/2010 |

\* cited by examiner

*Primary Examiner* — Kavel Singh
(74) *Attorney, Agent, or Firm* — Christensen, Fonder, Dardi & Herbert PLLC; Timothy J. Busse

(57) ABSTRACT

A powered transport for a gravity roller conveyor. The powered transport includes a motorized dolly for transporting, positioning, and deploying a roller ramp assembly. In some embodiments, the motorized dolly is provided with a retrofit kit for converting a conventional gravity roller conveyor to the powered transport.

17 Claims, 17 Drawing Sheets

POWERED TRANSPORT FOR TELESCOPING GRAVITY CONVEYOR

RELATED APPLICATIONS

This patent application claims the benefit of U.S. Provisional Patent Application No. 63/350,926, filed Jun. 10, 2022, the disclosure of which is hereby incorporated by reference in its entirety.

FIELD OF THE DISCLOSURE

This disclosure is directed generally to portable roller conveyors and more specifically to powered dollies for transporting roller conveyors.

BACKGROUND OF THE DISCLOSURE

The loading of packages from a warehouse onto trailers for transport often involves the use of portable telescoping gravity conveyors. In one example, a semi trailer is backed up to a loading dock and the conveyor rolled through the loading dock door and onto the trailer. The portable telescoping gravity conveyor is often moved and positioned onto the trailer with the aid of a dolly located at the receiving end of the conveyor. During the trailer loading process, the dolly is frequently repositioned along the length of the trailer bed to shorten or reposition a deployed length of the gravity conveyor as the trailer is ladened from the front end.

Portable telescoping gravity conveyors can be substantially big and heavy structures, with multiple nested roller ramps that can each exceed 3½ meters in length. Maneuvering and repositioning of such conveyors during deployment and use poses an injury risk to operating personnel. A system for mitigating such risks would be welcomed.

SUMMARY OF THE DISCLOSURE

Various embodiments of the disclosure present a powered transport for transporting a portable telescoping gravity conveyor. The powered transport includes a motorized dolly integrated into a base roller ramp with which a plurality of extension roller ramps may be nested. In some embodiments, the powered transport may be utilized to reconfigure the portable telescoping gravity conveyor from a stowed or transport configuration to an extended or deployed configuration.

In various embodiments of the disclosure, a kit is provided to retrofit existing roller ramp assemblies by replacing a manual dolly with the motorized dolly. The kit includes the motorized dolly and instructions for the installation.

Structurally, various embodiments of the disclosure are directed to a powered transport for transporting and deploying a telescoping gravity conveyor, comprising a chassis, a pair of wheel assemblies mounted to and extending beneath the chassis for support of the chassis, a power drive operatively coupled to the pair of wheel assemblies, the power drive being mounted to the chassis, and a base roller ramp coupled to the chassis. The powered transport may also include: a vertical package stop that extends vertically upward from the chassis, the vertical package stop including a plurality of vertical uprights; a package rest mounted to the chassis and extending orthogonal to the vertical package stop; a panel mounted to the vertical uprights, the panel including a stop portion affixed to a distal face of the vertical uprights and a base board portion that extends between the plurality of vertical uprights and is coupled to a proximal face of the vertical uprights, the base board portion of the panel defines a mounting slot providing access to a battery mount disposed within the base board; one or more courtesy lights mounted to the base board; a battery module including a core battery captured by a battery guard, the core battery being disposed through the mounting slot of the base board and seated on the battery support; a voltage converter operatively coupled to the core battery; a handlebar assembly including a cross bar supported by a strut that extends into one of the plurality of vertical uprights, the strut defining a plurality of apertures, the handlebar assembly including one or more handle grips coupled to the cross bar; and/or control boxes mounted to the handlebar assembly, the control boxes including a main power box and at least one motion control box, the at least one motion control box being operatively coupled to a control module for operation of the power drive.

The plunger stem is extendible into the one of the plurality of vertical uprights along the plunger axis for coupling with a selected one of the plurality of apertures of the strut. The strut may be one of a plurality of struts that support the handlebar assembly, the slot may be one of a plurality of slots, and/or the battery module may be one of a plurality of battery modules, the plurality of slots for accommodating the plurality of the battery modules.

In some embodiments, the powered transport includes a spring plunger assembly mounted to the one of the plurality of vertical uprights, the spring plunger assembly including a plunger stem and housing that define and are collinear with a plunger axis.

Various embodiments of the disclosure are directed to a method for retrofitting a telescoping gravity roller assembly with a powered dolly, comprising: providing a powered dolly; and providing assembly instructions on a tangible, non-transient medium, the assembly instructions including: coupling the powered dolly to a proximal end of a base roller ramp to suspend the base roller ramp between the powered dolly and a pair of casters at a distal end of the base roller ramp. In some embodiments, the assembly instructions provided in the step of providing assembly instructions includes: prior to the step of coupling the powered dolly to the proximal end of the base roller ramp, removing a manually powered package stop and brake assembly from the proximal end of the base roller ramp. The assembly instructions provided in the step of providing assembly instructions may include, during the step of coupling the powered dolly to the proximal end of the base roller ramp: aligning a first side rail mounting plate of the powered dolly with a first side rail of the base roller ramp; aligning a second side rail mounting plate of the powered dolly with a second side rail of the base roller ramp; registering the first side rail of the base roller ramp against a first bearing plate of the powered dolly; registering the second side rail of the base roller ramp against a second bearing plate of the powered dolly; and fastening the first side rail and the second side rail of the base roller ramp to the first side rail mounting plate and the second side rail mounting plate, respectively.

Various embodiments of the disclosure are directed to a method of deploying a roller ramp assembly is disclosed, comprising: transporting a plurality of extension roller ramps to a deployment site with a powered transport; anchoring a distal-most of the extension roller ramps; and driving the powered transport away from the distal-most of the extension roller ramps to extend the plurality of extension roller ramps between the powered transport and the distal-most of the extension roller ramps. The step of anchoring may include one or more of locking a caster wheel supporting the distal-most of the extension roller ramps, chocking the caster wheel supporting the distal-most of the extension roller ramps, deploying a retractable anchor coupled to the distal-most of the extension roller ramps, and manually holding onto the distal-most of the extension roller ramps.

Various embodiments of the disclosure are directed to a powered dolly for transport and deploying an assembly of roller ramps, comprising a chassis including side members that extend axially and cross members that extend laterally, a power drive operatively coupled to one of a pair of wheel assemblies, the power drive and the pair of wheel assemblies being mounted to the chassis, and a vertical package stop that extends vertically upward from the chassis, the vertical package stop including a plurality of vertical uprights. In some embodiments, a pair of skid plates and a pair of side rail mounting plates are coupled to the chassis for coupling of a base roller ramp thereto. A package rest may be mounted to the chassis and extending orthogonal to the vertical package stop. In some embodiments, a panel is mounted to the vertical uprights, the panel including a stop portion affixed to a distal face of the vertical uprights and a base board portion that extends between the plurality of vertical uprights and is coupled to a proximal face of the vertical uprights, the base board portion of the panel defines a mounting slot providing access to a battery mount disposed within the base board.

In some embodiments, handlebar assembly may include a cross bar supported by a strut that extends into one of the plurality of vertical uprights, the strut defining a plurality of apertures, the handlebar assembly including one or more handle grips coupled to the cross bar. The strut may be one of a plurality of struts that support the handlebar assembly. Control boxes may be mounted to the handlebar assembly, the control boxes including a main power box and at least one motion control box, the at least one motion control box being operatively coupled to a control module for operation of the power drive.

A spring plunger assembly may be mounted to the one of the plurality of vertical uprights, the spring plunger assembly including a plunger stem and housing that define and are collinear with a plunger axis, the plunger stem being extendible into the one of the plurality of vertical uprights along the plunger axis for coupling with a selected one of the plurality of apertures of the strut. In some embodiments, a battery module including a core battery is captured by a battery guard, the core battery being disposed through the mounting slot and seated on the battery support. A voltage converter may be operatively coupled to the core battery. The slot may be one of a plurality of slots and the battery module may be one of a plurality of battery modules, the plurality of slots for accommodating the plurality of battery modules.

DETAILED DESCRIPTION

Figure 1:
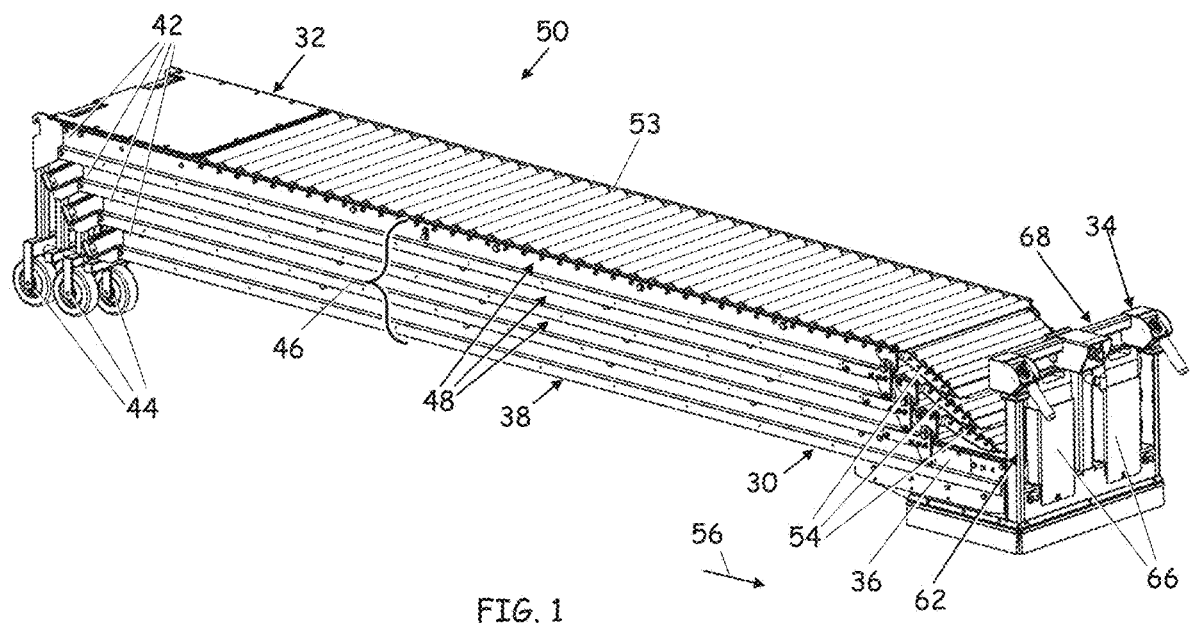
FIG. 1 is a perspective view of a telescoping gravity conveyor with a powered transport in a stowed configuration according to an embodiment of the disclosure.
Figure 2:
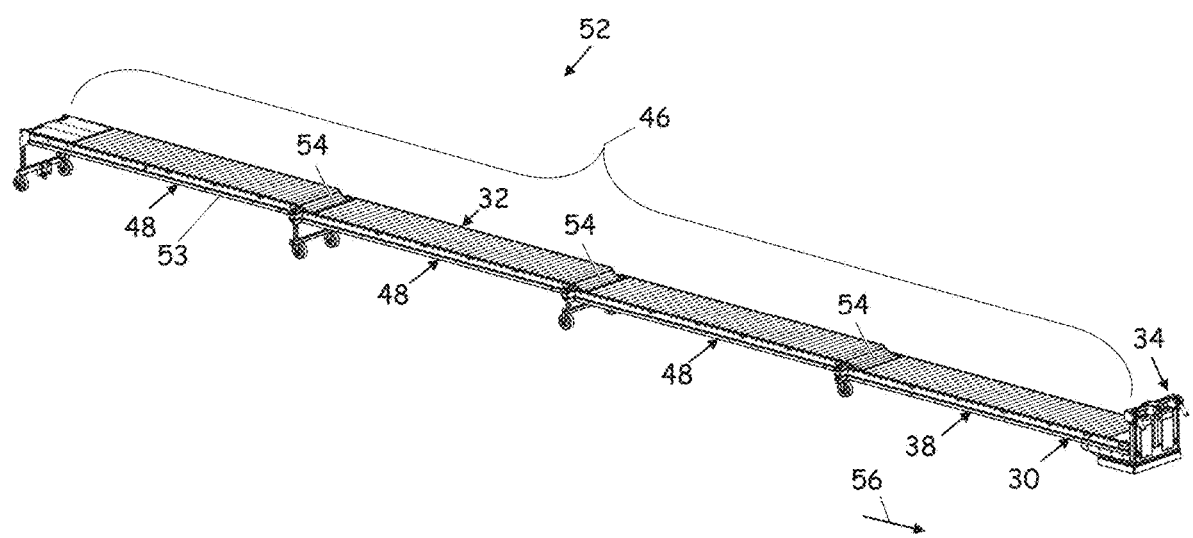
FIG. 2 is a perspective view of the telescoping gravity conveyor of FIG. 1 in an extended configuration according to an embodiment of the disclosure.
Figure 3:
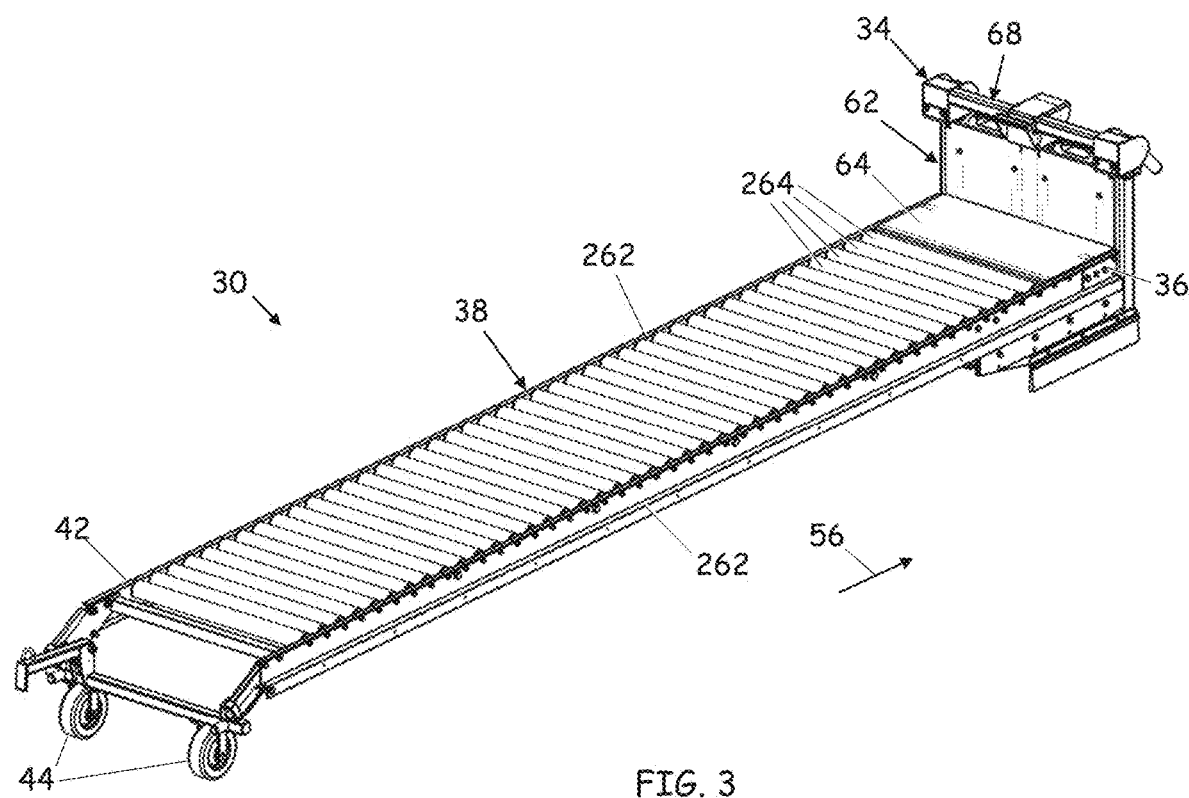
FIG. 3 is a perspective view of the powered transport of FIG. 1 in isolation according to an embodiment of the disclosure.

Referring to FIGS. 1 through 3, a powered transport 30 for a telescoping gravity conveyor 32 is depicted according to an embodiment of the disclosure. The powered transport 30 includes a motorized dolly 34 coupled to a proximal end 36 of a base roller ramp 38. The telescoping gravity conveyor 32 includes a roller ramp assembly 46 that includes the base roller ramp 38 with one or more extension roller ramps 48 that ride atop the base roller ramp 38. Distal ends 42 of the roller ramps 38, 48 are suspended on casters 44. The roller ramps 38, 48 of the roller ramp assembly 46 are slidingly coupled to each other for arrangement in a transport or stowed configuration 50 (FIG. 1) or a deployed or extended configuration 52 (FIG. 2). In some embodiments, an upper-most extension roller ramp 53 of the extension roller ramps 48 is also the distal-most extension roller ramp 53 when in the deployed configuration 52. As such, the upper-most extension roller ramp 53 and the distal-most extension roller ramp 53 are used interchangeably herein. Each extension roller ramp 48 may include a transfer ramp 54 that extends in a proximal direction 56 from the respective extension roller ramp 48 to provide an inclined transition between successive roller ramps 48, 38. The motorized dolly 34 includes a vertical package stop 62, a horizontal package rest 64, one or more battery modules 66, and a handlebar assembly 68.

Figure 4A:
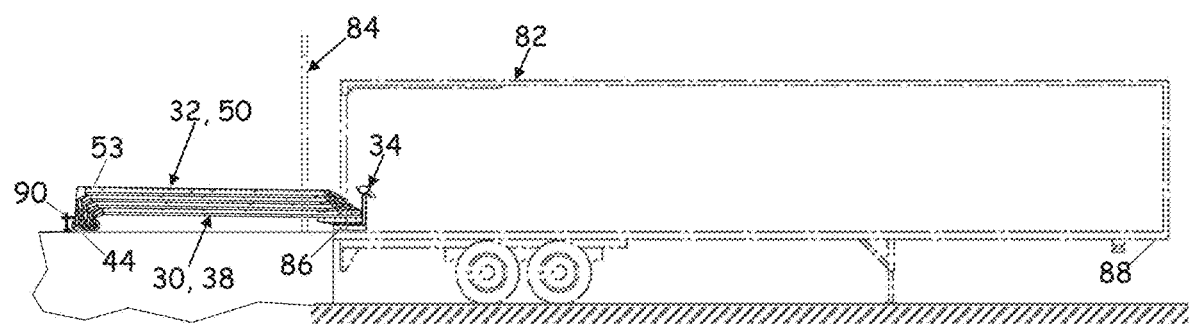
FIGS. 4A and 4B are elevational views of the telescoping gravity conveyors of FIGS. 1 and 2, respectively, in operation for loading a semi trailer according to embodiments of the disclosure.
Figure 4B:
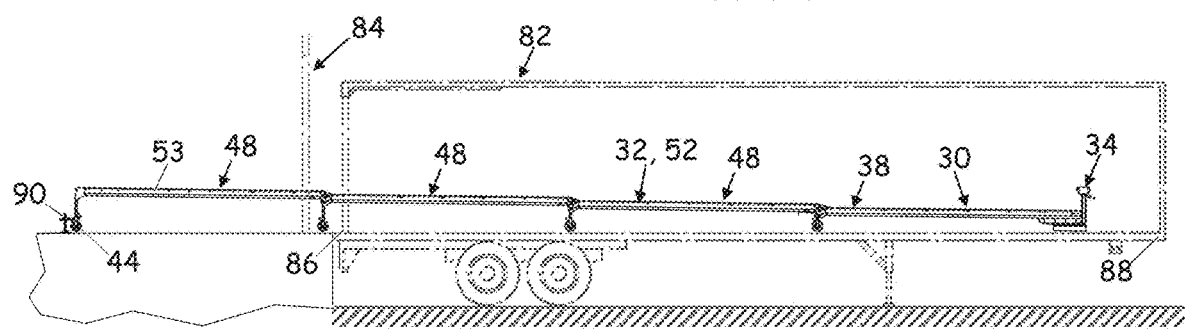
Figure 5:
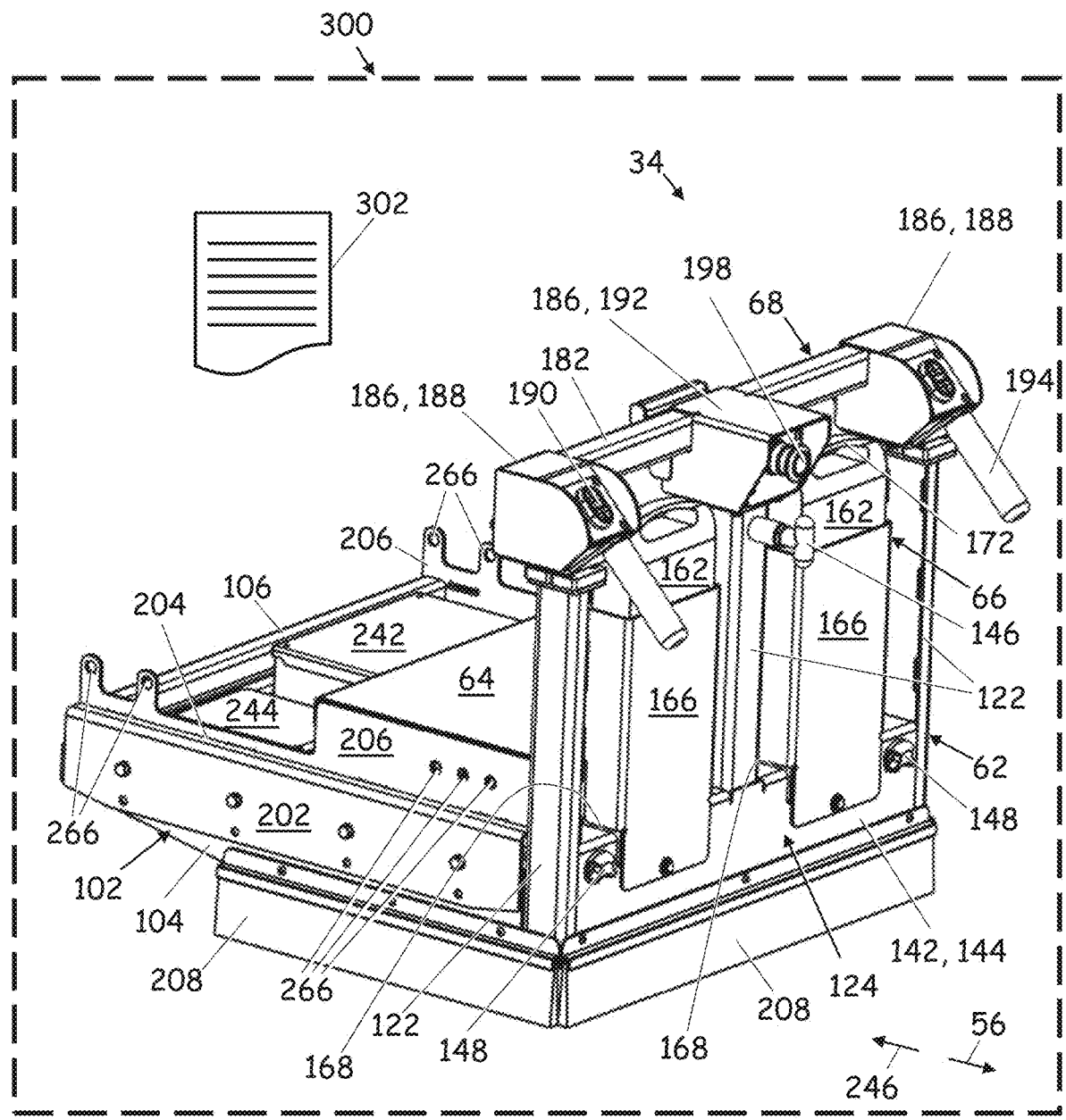
FIG. 5 is a rear perspective view of a motorized dolly of the powered transport of FIG. 3 according to an embodiment of the disclosure.
Figure 6:
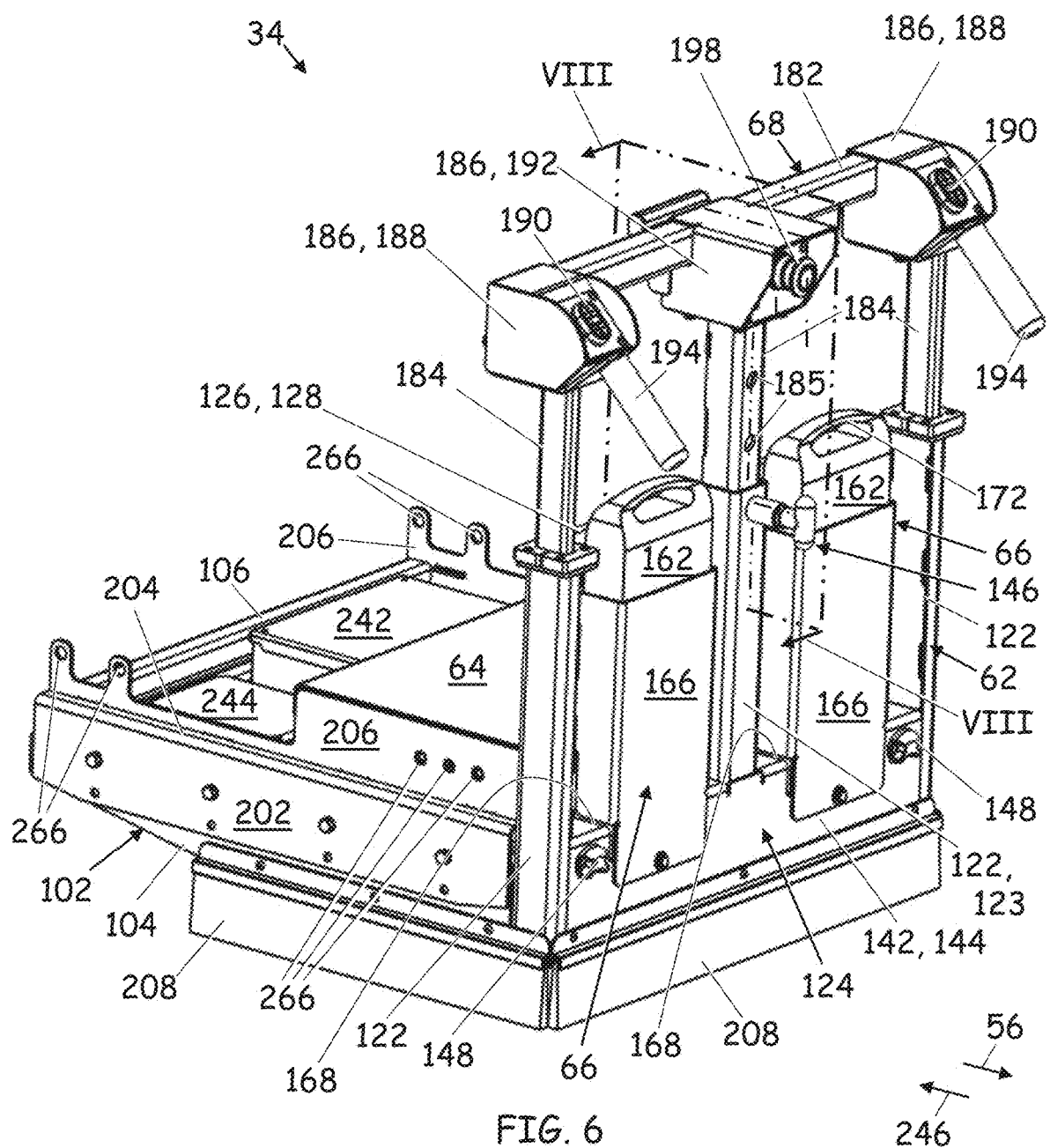
FIG. 6 is a rear perspective view of the motorized dolly of FIG. 5 with a handlebar assembly extended upward according to an embodiment of the disclosure.
Figure 7:
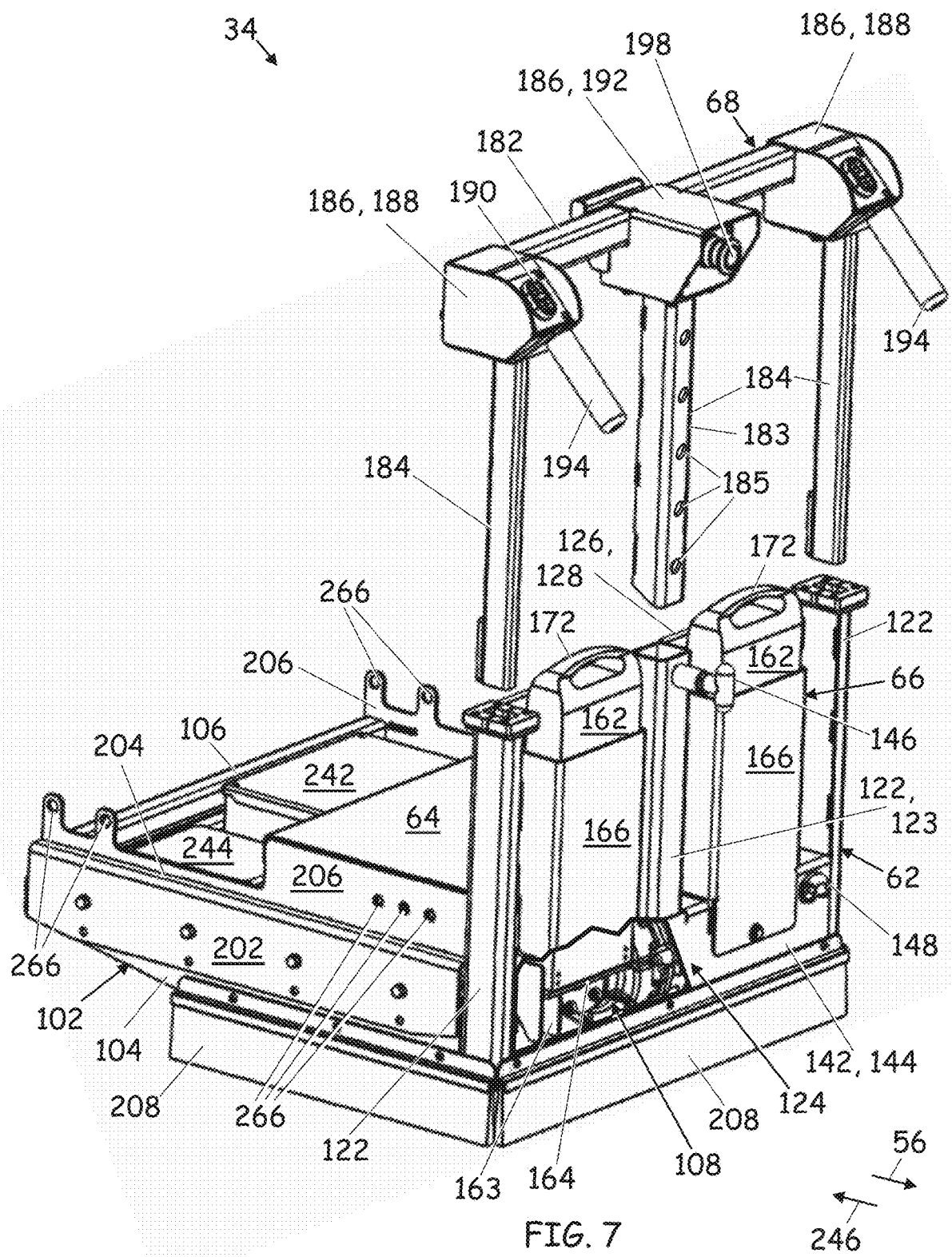
FIG. 7 is a rear perspective, partial cutaway view of the motorized dolly of FIG. 5 with a handlebar assembly elevated according to an embodiment of the disclosure.

Referring to FIGS. 4A and 4B, an example of an operation of the powered transport 30 in a warehouse loading scenario is depicted according to an embodiment of the disclosure. A semi trailer 82 is situated at a loading dock 84 for receiving packages. Using the motorized dolly 34, the powered transport 30 is transported to the loading dock 84 in the transport configuration 50 and positioned proximate a threshold 86 of the semi trailer 82 (FIG. 4A), with the proximal end 36 (i.e., the motorized dolly 34) leading into the semi trailer 82. The motorized dolly 34 may be used to reconfigure the roller ramp assembly 46 into the deployed configuration 52 by pulling the base roller ramp 38 towards a front end 88 of the semi trailer 82, thereby extending the individual extension roller ramps 48 of the roller ramp assembly 46 as the powered transport 30 progresses toward the front end 88 (FIG. 4B). The distal-most extension roller ramp 53 of the individual extension roller ramps 48 may be anchored during reconfiguration to the deployed configuration 52, for example, by locking or chocking the respective casters 44, deployment of one or more retractable anchor(s) 90, and/or having operating personnel hold the upper-most 53 of the extension roller ramps 48 in place as the powered transport 30 progresses towards the front end 88 of the semi trailer 82.

The retractable anchor(s) 90 is coupled to the upper-most extension roller ramps 53 and may include, for example, a high friction pad that is seated against a floor of a warehouse with a downward force that lifts the casters 44 off the floor or otherwise prevents the casters 44 of the upper-most 53 extension roller ramp 48 from rolling. The retractable anchor(s) 90 may be set, for example, by threaded actuation, toggle clamp, or a jack.

Referring to FIGS. 5 through 11, the motorized dolly 34 is depicted in greater detail according to an embodiment of the disclosure. The motorized dolly 34 includes a chassis frame assembly 102 that supports the vertical package stop 62 and the horizontal package rest 64. The chassis frame assembly 102 includes side members 104 that are separated by cross members 106 and houses an electric transaxle power drive 108.

The vertical package stop 62 may include one or more vertical uprights 122 to which a panel 124 is coupled. In the depicted embodiment, there are three vertical uprights 122, including a central vertical upright 123. The panel 124 includes a stop portion 126 that is situated on a distal face 128 of the vertical package stop 62. In some embodiments, the panel 124 defines a base board portion 142 that extends to a proximal face 144 of motorized dolly 34. In some embodiments, the vertical package stop 62 includes one or more courtesy lights 148.

The vertical package stop 62 may include a plunger assembly 146 mounted to one of the vertical uprights 122, for example the central vertical upright 123, the plunger assembly 146 being accessible from the proximal face 144 of the motorized dolly 34. In some embodiments, the plunger assembly 146 includes a plunger stem 150 disposed and captured within a housing 154, the stem 150 and housing 154 defining and being collinear about a plunger axis 156. A biasing element 158 may be disposed in the housing 154 to bias the plunger stem 150 into the vertical upright 122, 123. The plunger stem 150 may extend into the vertical upright 122, 123 via an access aperture 152. The housing 154 may be affixed to the vertical upright 122, 123, for example, by welding or by threaded coupling.

In some embodiments, the handlebar assembly 68 includes a cross bar 182 supported by one or more struts 184, each of the struts 184 corresponding to a respective vertical upright 122. The strut(s) 184 extend into or otherwise alongside the one or more vertical uprights 122. In some embodiments, one of the struts 184, for example a central strut 183, defines a plurality of apertures 185 sized to receive the plunger stem 150 of the plunger assembly 146.

Figure 8A:
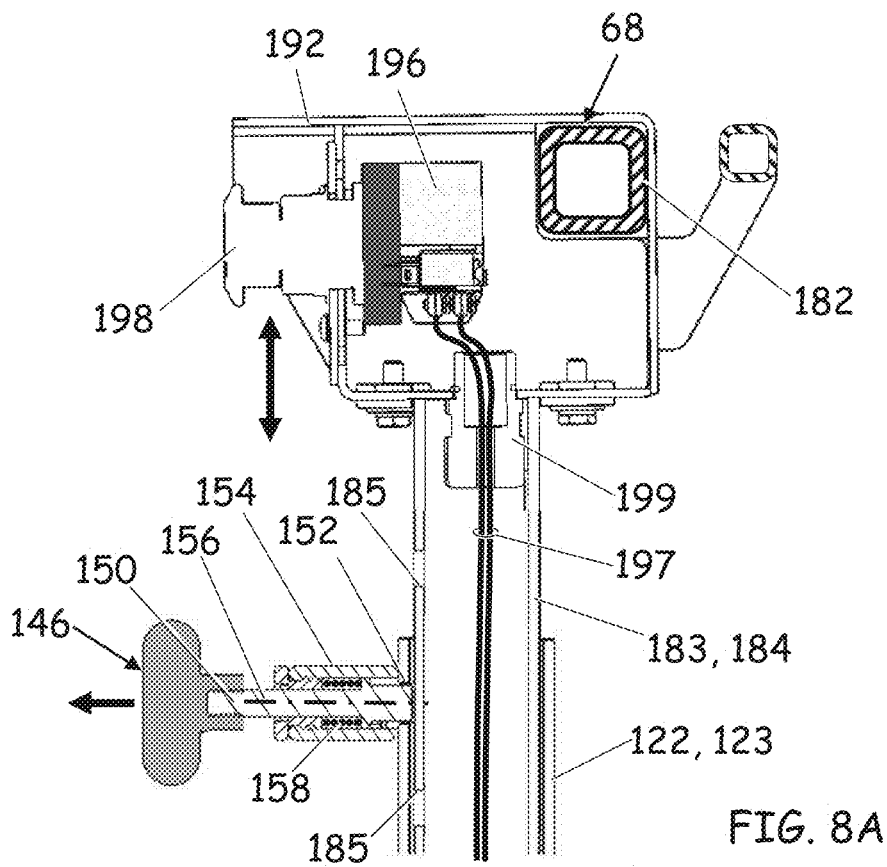
FIG. 8A is a sectional view of a plunger assembly and main power box at plane VIII-VIII during a height adjustment according to an embodiment of the disclosure.
Figure 8B:
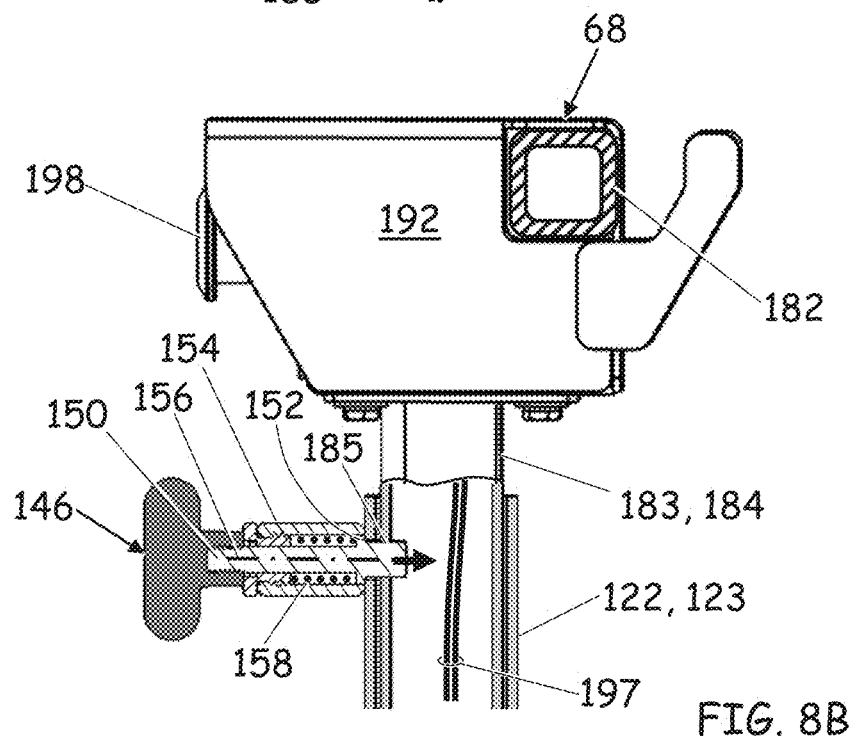
FIG. 8B is a partial sectional view of the plunger assembly and main power box at plane VIII-VIII at a secured height adjustment according to an embodiment of the disclosure.
Figure 9:
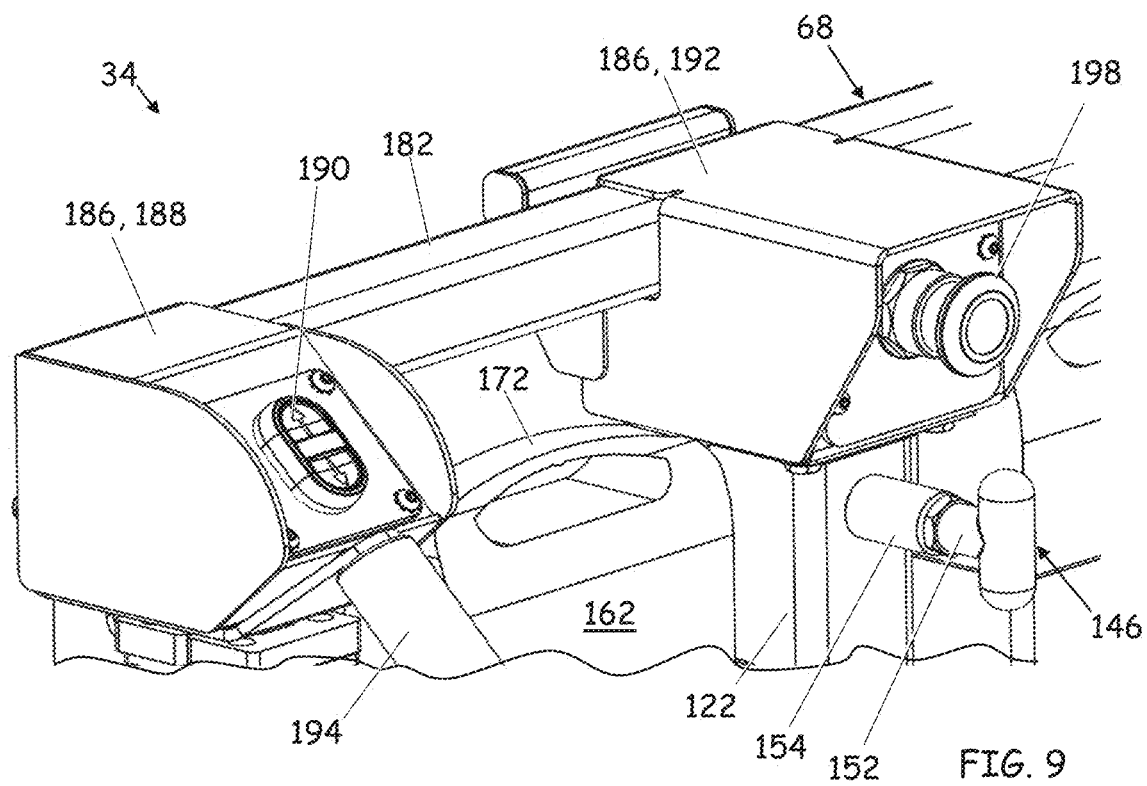
FIG. 9 is an enlarged, partial perspective view of the motorized dolly of the powered transport of FIG. 3 according to an embodiment of the disclosure.

Functionally, the plunger assembly provides for adjustment of a vertical height of the handlebar assembly 68. The operator pulls the plunger stem 150 proximally and adjusts the vertical position of the strut 184 within the vertical uprights 122 (FIG. 8A). The operator may release the plunger stem 150 during the vertical adjustment, whereby the stem 150 is biased against the strut 184, 183 between locations of the apertures 185. When one of the apertures 185 becomes aligned with the plunger axis 156, the plunger stem 150 is driven into the aperture 185 to secure the height of the handlebar 68 (FIG. 8B).

Each battery module 66 includes a core battery 162 that may be situated on battery supports 164 coupled to the chassis frame assembly 102, for example with brackets 163 that extend from axially extending supports 165 that are supported by the chassis frame assembly 102. In some embodiments, the battery core 162 is housed in a battery guard 166. The battery module(s) 66 may be inserted through mounting slots 168 defined by the base board portion 142 of the panel 124 to access the battery supports 164, with the battery guard(s) 166 being fastened to the base board portion 142. Each battery module 66 may include a handle 172.

The cross bar 182 may support one or more console boxes 186. In the depicted embodiment, there are three such console boxes 186—two motion control boxes 188 for controlling the forward and backward motion of the motorized dolly 34 and a main power box 192 for energizing and de-energizing the motorized dolly 34. The motion control boxes 188 may each include a directional push button or rocker switch 190 for selecting the forward and rearward motion of the motorized dolly 34.

The main power box 192 may include a switch or relay 196 for energizing the motorized dolly 34 with the battery module(s) 66, with wiring 197 being routed through the vertical strut 184 via a bulkhead connector 199 anchored to the main power box 192 (FIG. 8A). The switch or relay 196 may be activated and deactivated by an e-stop style button 198. The handlebar assembly 68 may also include grips 194 that are coupled to the cross bar 182 and/or vertical strut(s) 184, for example at one or more of the console boxes 186 (depicted).

Various components are mounted to the chassis frame assembly 102. In some embodiments, a skid plate 202 is mounted to each of the side members 104, providing upper bearing surfaces 204. A side rail mounting plate 206 may be coupled to each of the skid plates 202. In some embodiments, brush assemblies 208 depend from the skid plates 202 and from the base board portion 142 of the panel 124.

In some embodiments, a pair of wheel assemblies 222 are coupled to the chassis frame assembly 102. Each of the wheel assemblies 222 depend from the axially extending supports 165 that is attached, for example, to the cross members 106 and/or base board portion 142. The chassis frame assembly 102 may house the electric transaxle power drive 108 that includes an electric motor 226, a gear box 228, and an axle 232, and is configured to drive one of the wheel assemblies 222. The chassis frame assembly 102 may also include a voltage converter 242 that converts the voltage of the battery module(s) 66 to a voltage appropriate for driving the electric motor 226. In some embodiments, a control module 244 for operation of the transaxle power drive 108 is also housed in the chassis frame assembly 102. The package rest 64 may extend between the side rail mounting plates 206 to cover the wheel assemblies 222 and transaxle power drive 108.

Functionally, the base roller ramp 38 is the lowermost of the assembled roller ramps 46, and therefore the last of the assembled roller ramps 46 over which packages are conveyed. As such, the vertical package stop 62 acts to stop packages that traverse the length of the roller ramp assembly 46, which positions the package on the package rest 64. The struts 184 of the handlebar assembly 68 slide within or otherwise adjacent to the vertical uprights 122 of the vertical package stop 62 for selectively positioning the console boxes 186 at a height selected by the operator.

The spring loading of the plunger assembly 146 biases a detent Alternatively, set screw (not depicted) may be threadably mounted to the respective vertical upright 122 that clamps against a respective one of the struts 184 to secure the handlebar assembly 68 at the selected height. The courtesy light(s) may act as puddle lamp(s) that illuminate the path over which the operator walks. The handle 172 of the battery module(s) 66 assist the operator in installation and removal of the battery module(s) 66. The brush assemblies 208 act to clear debris from the path of the wheel assembly when the motorized dolly 34 is operated in reverse and/or steered to the side.

The motion control boxes 188 operate to power the motorized dolly 34 in a distal (forward) direction 246 and the proximal (rearward) direction 56. The interface for the motion control may be, for example, the depicted push button or rocker switch 190, a joy stick, a thumb lever, or a hand lever. In the depicted embodiment, the function of each of the motion control boxes 188 is identical. That is, the forward and rearward motion of the motorized dolly 34 may be controlled using either of the motion control boxes 188 and does not require both motion control boxes 188. The duplicity of the motion control boxes 188 provides convenient operation of the motorized dolly 34 from a wider range of operator positions. The handle grips 194 are used to physically exert forces on the motorized dolly 34, such as a lateral force or a rotational moment for alignment of the base and extension roller ramps 38, 48 during transport and deployment into the extended configuration 52.

The skid plates 202 and side rail mounting plates 206 facilitate the assembly and coupling of the base roller ramp 38 to the motorized dolly 34. The base roller ramp 38 includes side rails 262 to which rollers 264 are mounted. In some embodiments, the chassis frame assembly 102 is configured so that the side rails 262 of the base roller ramp 38 are registered against the upper bearing surfaces 204 of the skid plates 202 and straddle the side rail mounting plates 206. The side rails 262 and side rail mounting plates 206 define matching hole patterns 266 through which fasteners are used to affix the base roller ramp 38 to the motorized dolly 34.

Figure 12:
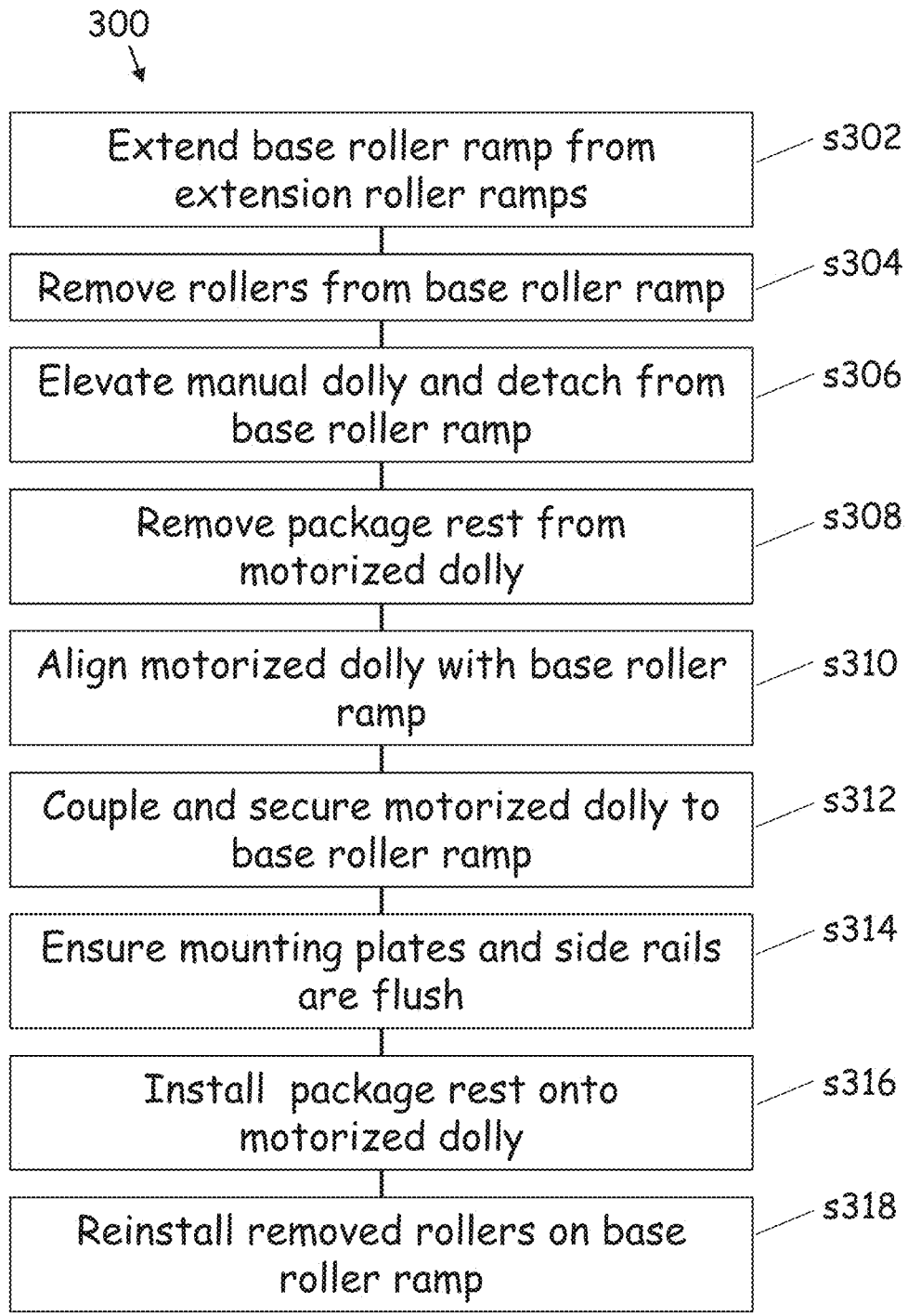
FIG. 12 is a flow diagram of a method for retrofitting a motorized dolly to an existing manual dolly according to an embodiment of the disclosure.

Referring to FIGS. 12 through 17, a method 300 for retrofitting a conventional manually powered telescoping gravity conveyor 280 with the motorized dolly 34 is depicted according to an embodiment of the disclosure. The steps of the method 300 are depicted at FIG. 12, with various hardware configurations for the steps of the method depicted at FIGS. 13 through 17. The manually powered telescoping gravity conveyor 280 includes a manual dolly 282 that supports a package stop 284 and a brake assembly 286. Other components and attributes of the roller ramp assembly 46 common to the telescoping gravity conveyor 32 are identified with same-labeled reference characters.

Figure 13:
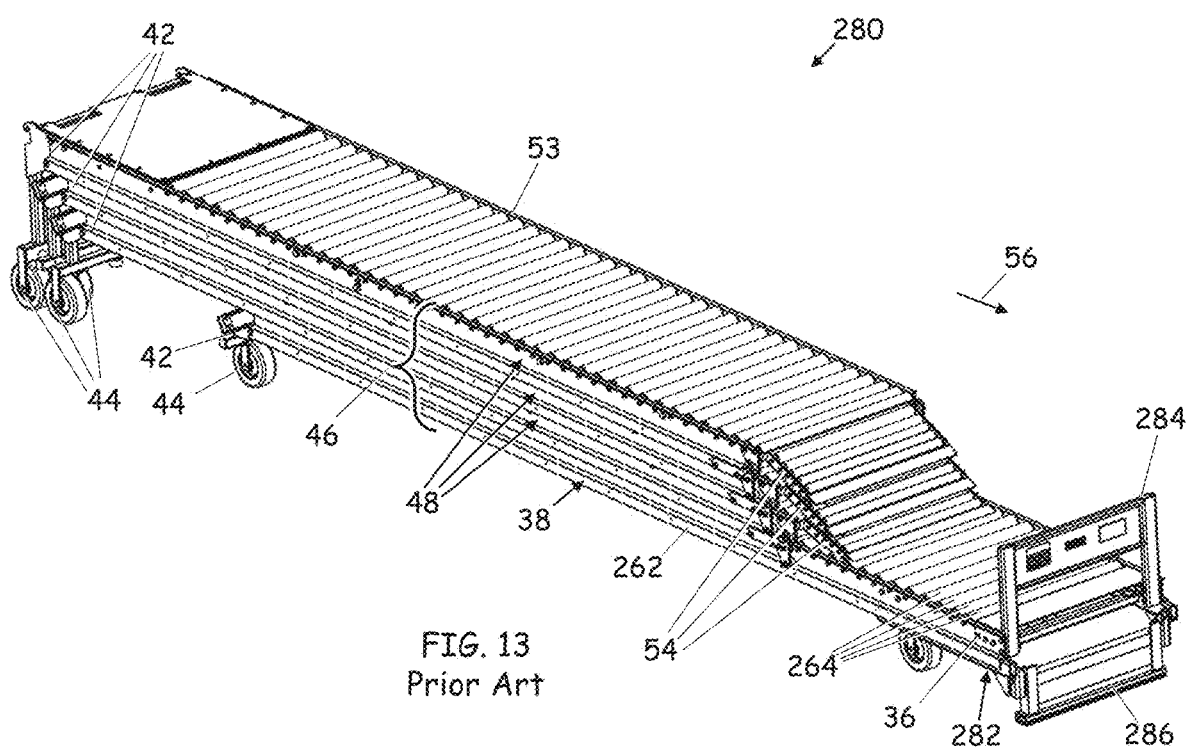
FIG. 13 is a perspective view of a conventional telescoping gravity conveyor with a manual dolly and having a base roller ramp partially separated from a plurality of extension roller ramps.

In some embodiments, some or all of the following steps may be implemented to retrofit the manually powered telescoping gravity conveyor 280 with the motorized dolly 34:

Extend the base roller ramp 38 away from the extension roller ramps 48 to enable access to the manual dolly 282 (s302 and FIG. 13).

Figure 14:
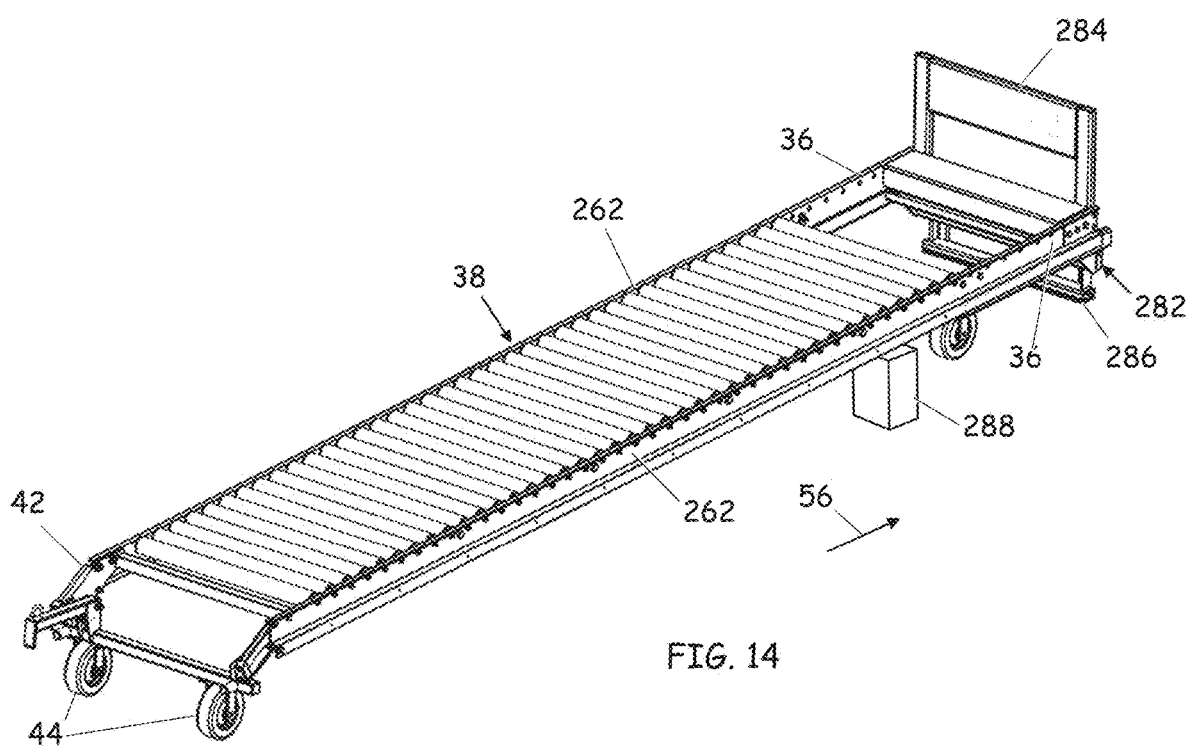
FIG. 14 is a perspective view of a base roller ramp and the manual dolly in isolation with rollers removed and positioned on blocks for access to the manual dolly according to an embodiment of the disclosure.

Remove enough rollers 264 from the proximal end 36 of the base roller ramp 38 to enable access to hardware that affixes the manual dolly 282 to the base roller ramp 38 (s304 and FIG. 14).

Elevate the manual dolly 282 and the base roller ramp 38 and place on blocks or jack stands 288 (s306 and FIG. 14).

Figure 15:
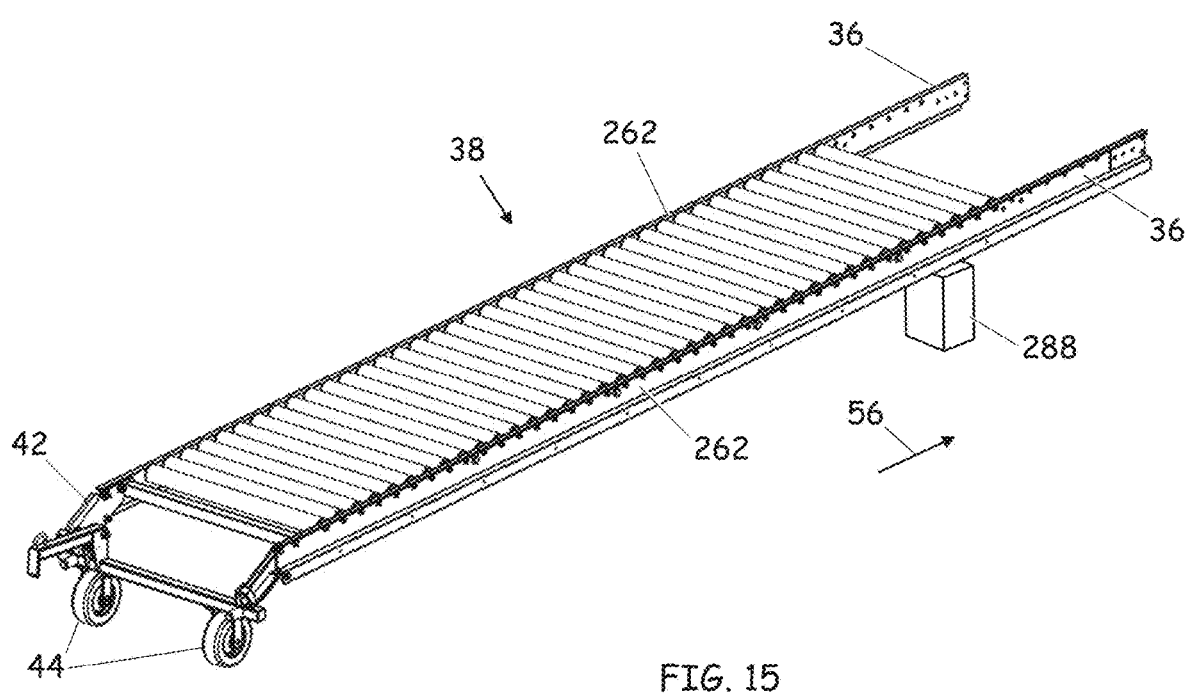
FIG. 15 is a perspective view of the base roller ramp of FIG. 13 with the manual dolly removed according to an embodiment of the disclosure.

Remove the manual dolly from the base roller ramp 38 (s306 and FIG. 15).

Figure 10:
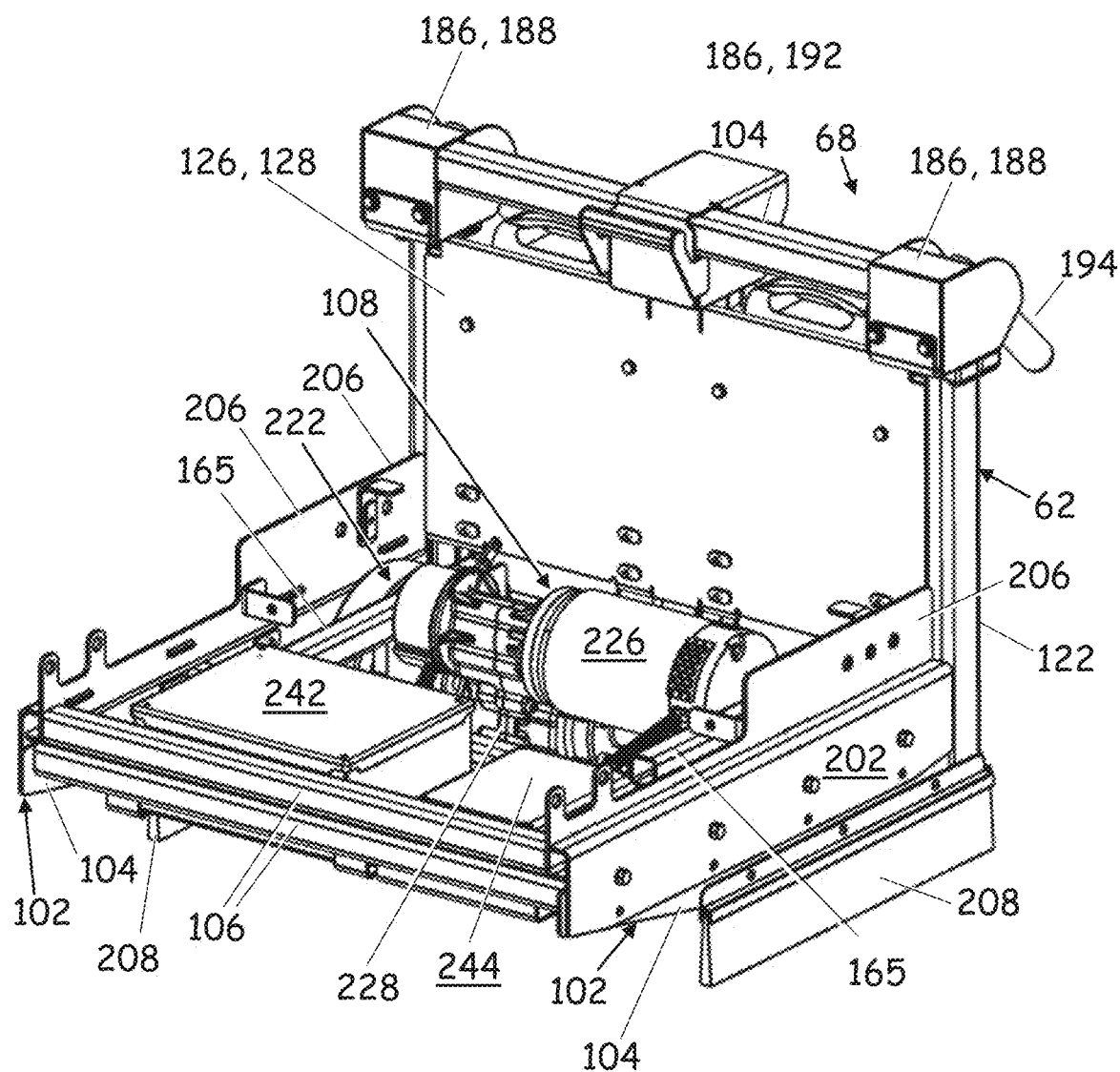
FIG. 10 is a front perspective view of the motorized dolly of FIG. 3 with a cover plate removed for clarity according to an embodiment of the disclosure.
Figure 11:
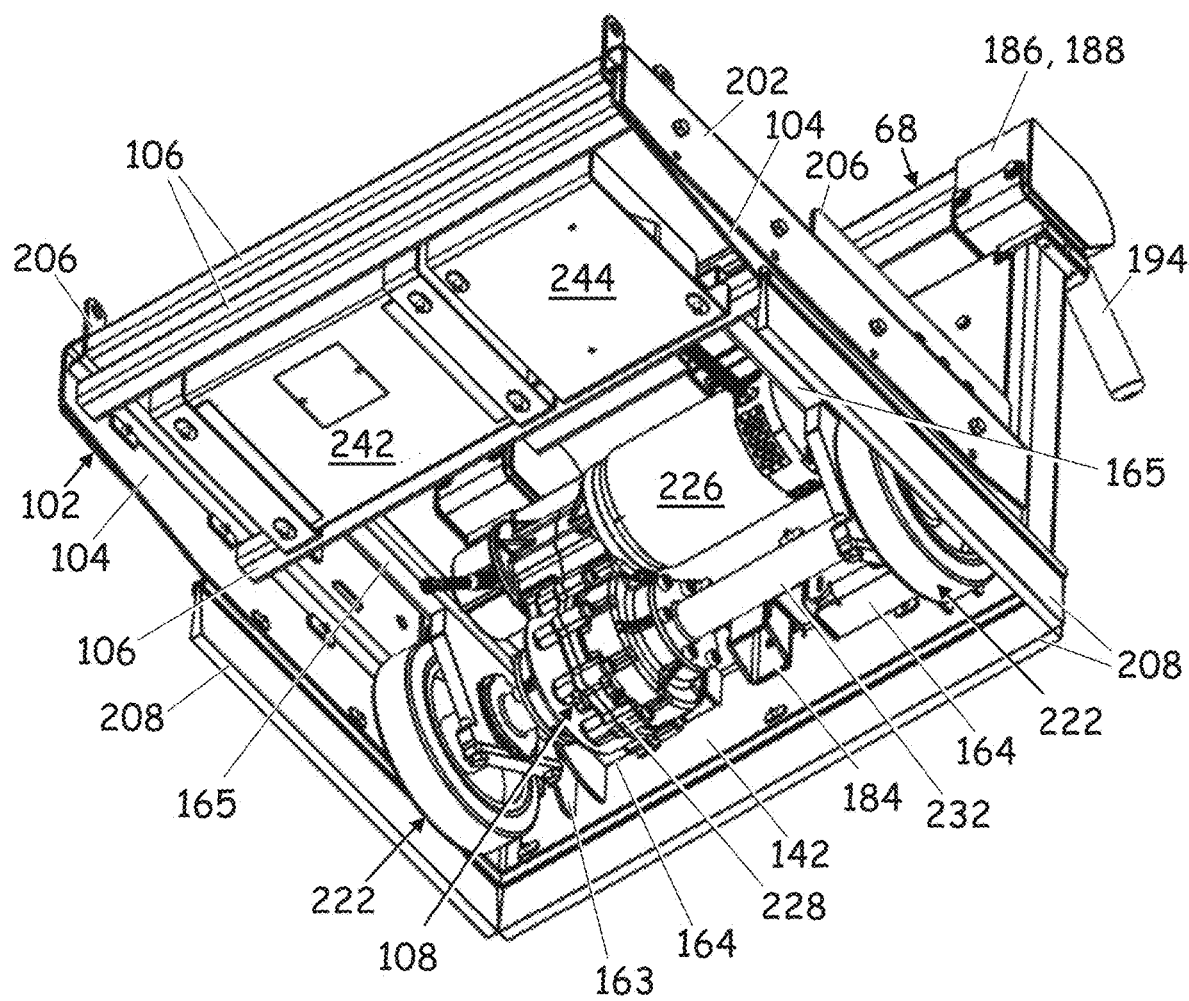
FIG. 11 is a bottom perspective view of the motorized dolly of FIG. 3 according to an embodiment of the disclosure.

Remove the package rest 64 (cover plate) from the motorized dolly 34 (s308, as seen in FIG. 10).

Figure 16:
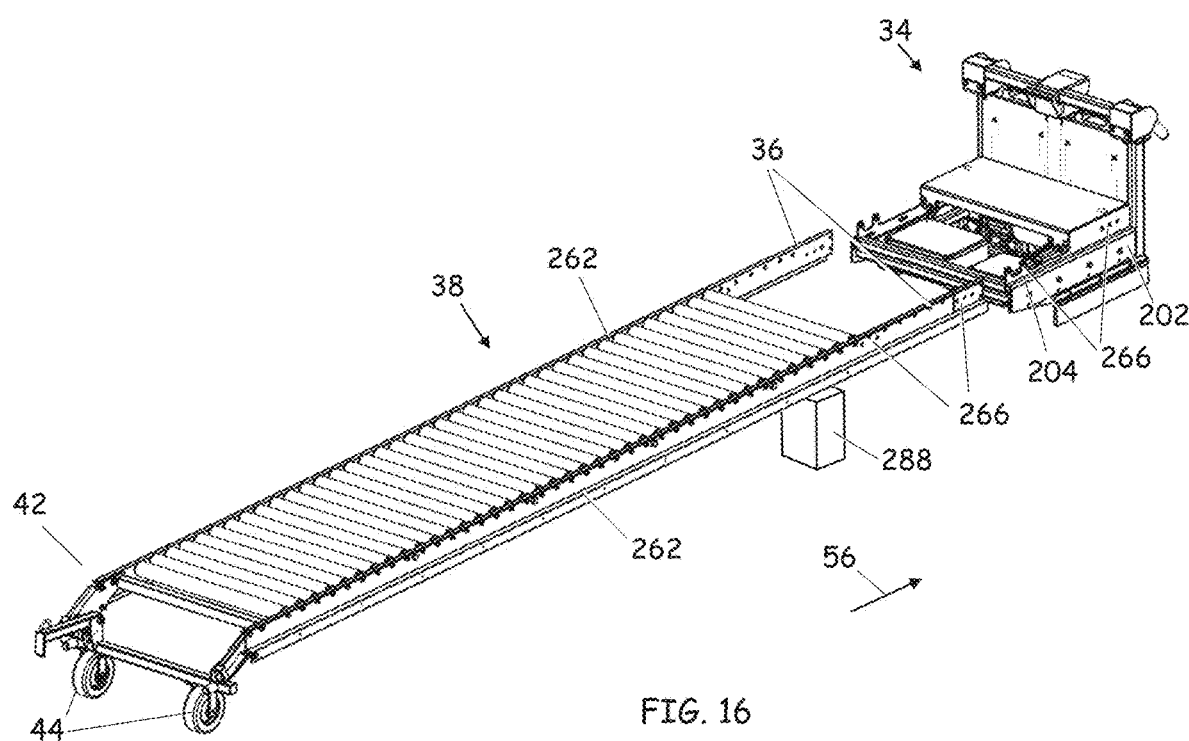
FIG. 16 is a perspective view of the motorized dolly of FIG. 3 in alignment with the base roller ramp of FIG. 15 according to an embodiment of the disclosure.

Align the motorized dolly 34 with the side rails 262 of the base roller ramp 38 (s310 and FIG. 16).

Figure 17:
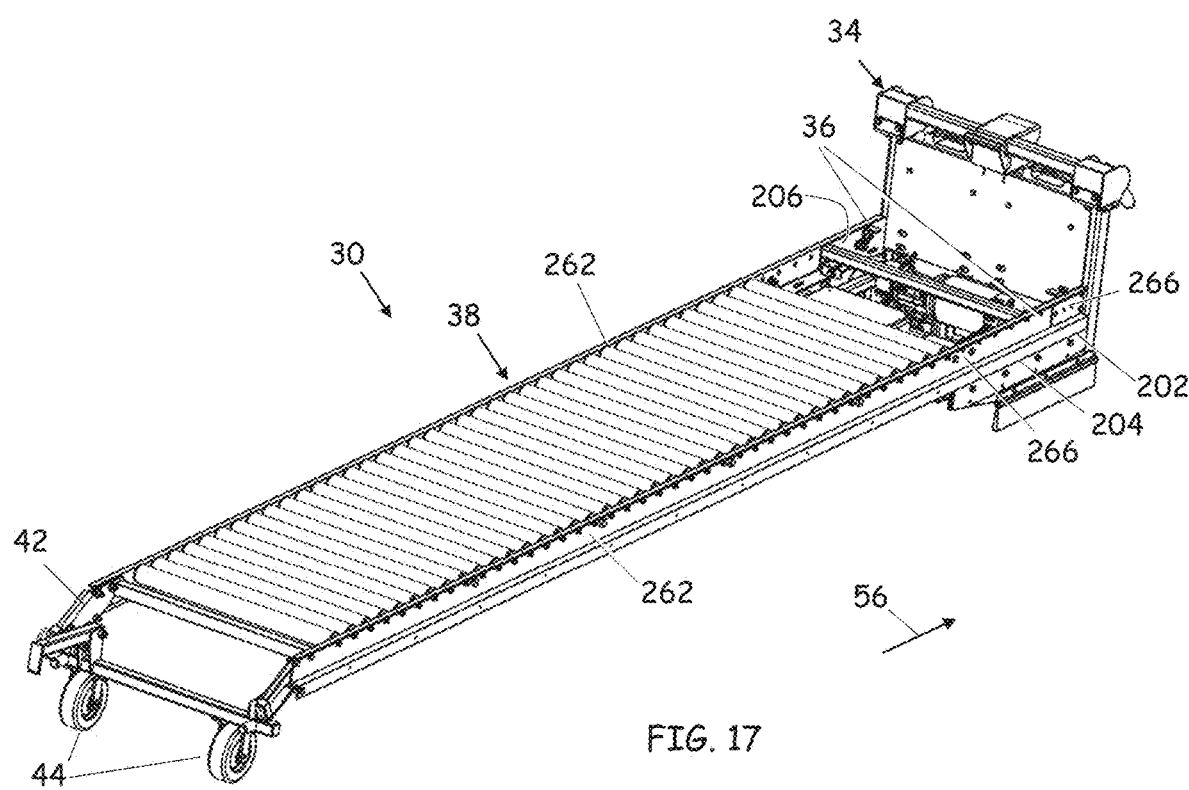
FIG. 17 is a perspective view of the motorized dolly and roller ramp of FIG. 16 coupled together according to an embodiment of the disclosure.

Couple the motorized dolly 34 and the base roller ramp 38 so that the proximal end 36 of the base roller ramp 38 is supported by the upper bearing surfaces 204 of the skid plates 202 (s312 and FIG. 17).

Adjust the position of the motorized dolly 34 relative the base roller ramp 38 to align the matching hole patterns 266 of the side rails 262 and the side rail mounting plates 206 (s312 and FIG. 16). Loosely assemble the base roller ramp 38 to the motorized dolly 34.

Ensure the side rail mounting plates 206 of the motorized dolly 34 are flush with the side rails 262 of the base roller ramp 38 to within specified tolerance (s314).

Secure the base roller ramp 38 to the motorized dolly 34 by tightening the appropriate hardware (s312).

Install the package rest 64 (cover plate) onto the motorized dolly 34 and secure with fasteners (s316, as depicted in FIG. 3).

Re-install rollers 264 on the base roller ramp 38 as space permits (s318, as depicted in FIG. 3).

In some embodiments, there may not be room to re-install all of the rollers 262 initially removed from the base roller ramp 38. In some embodiments, the tolerance for the flush mounting of the side rails 262 of the base roller ramp 38 to the side rail mounting plates 206 of the motorized dolly 34 is in a range of 1 millimeter to 2.5 millimieters inclusive.

In some embodiments, the motorized dolly 34 is provided as part of a retrofit kit 330 (depicted at FIG. 5), complete with instructions 332 for assembly. The instructions 332 are provided on a tangible, non-transitory medium, and may be physically included with the kit 330 such as on a printed document (depicted), compact disc, or flash drive. Non-limiting examples of a tangible, non-transitory medium include a paper document and computer-readable media including compact disc and magnetic storage devices (e.g., hard disk, flash drive, cartridge, floppy drive). The computer-readable media may be local or accessible over the internet. The instructions 332 may be complete on a single medium, or divided among two or more media. For example, some of the instructions 332 may be written on a paper document that instruct the user to access one or more of the steps of the method over the internet, the internet-accessible steps being stored on a computer-readable medium or media. The instructions 332 may embody the techniques and methods depicted or described herein using text, photos, videos, or a combination thereof to instruct and guide the user. The instructions may be in the form of written words, figures, photos, video presentations, or a combination thereof to instruct and guide the user.

Each of the additional figures and methods disclosed herein can be used separately, or in conjunction with other features and methods, to provide improved devices and methods for making and using the same. Therefore, combinations of features and methods disclosed herein may not be necessary to practice the disclosure in its broadest sense and are instead disclosed merely to particularly describe representative and preferred embodiments.

Various modifications to the embodiments may be apparent to one of skill in the art upon reading this disclosure. For example, persons of ordinary skill in the relevant arts will recognize that the various features described for the different embodiments can be suitably combined, un-combined, and re-combined with other features, alone, or in different combinations. Likewise, the various features described above should all be regarded as example embodiments, rather than limitations to the scope or spirit of the disclosure.

Persons of ordinary skill in the relevant arts will recognize that various embodiments can comprise fewer features than illustrated in any individual embodiment described above. The embodiments described herein are not meant to be an exhaustive presentation of the ways in which the various features may be combined. Accordingly, the embodiments are not mutually exclusive combinations of features; rather, the claims can comprise a combination of different individual features selected from different individual embodiments, as understood by persons of ordinary skill in the art.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

Unless indicated otherwise, references to "embodiment(s)", "disclosure", "present disclosure", "embodiment(s) of the disclosure", "disclosed embodiment(s)", and the like contained herein refer to the specification (text, including the claims, and figures) of this patent application that are not admitted prior art.

For purposes of interpreting the claims, it is expressly intended that the provisions of 35 U.S.C. 112 (f) are not to be invoked unless the specific terms "means for" or "step for" are recited in the respective claim.

What is claimed is:

1. A powered transport for transporting and deploying a telescoping gravity conveyor, comprising:
   a chassis comprising a vertical package stop that extends vertically upward from said chassis, said vertical package stop including a plurality of vertical uprights;
   a pair of wheel assemblies mounted to and extending beneath said chassis for support of said chassis;
   a power drive operatively coupled to one of said pair of wheel assemblies, said power drive being mounted to said chassis comprising a handlebar assembly including a cross bar supported by a strut that extends into one of said plurality of vertical uprights, said strut defining a plurality of apertures, said handlebar assembly including one or more handle grips coupled to said cross bar and control boxes mounted to said handlebar assembly, said control boxes including a main power box and at least one motion control box, said at least one motion control box being operatively coupled to a control module for operation of said power drive; and
   a base roller ramp coupled to said chassis.

2. The powered transport of claim 1, comprising a package rest mounted to said chassis and extending orthogonal to said vertical package stop.

3. The powered transport of claim 1, comprising a panel mounted to said vertical uprights, said panel including a stop portion affixed to a distal face of said vertical uprights and a base board portion that extends between said plurality of vertical uprights and is coupled to a proximal face of said vertical uprights, said base board portion of said panel defines a mounting slot providing access to a battery mount disposed within said base board.

4. The powered transport of claim 3, comprising one or more courtesy lights mounted to said base board.

5. The powered transport of claim 3, comprising a battery module including a core battery captured by a battery guard, said core battery being disposed through said mounting slot of said base board and seated on a battery support.

6. The powered transport of claim 5, comprising a voltage converter operatively coupled to said core battery.

7. The powered transport of claim 1, comprising a spring plunger assembly mounted to said one of said plurality of vertical uprights, said spring plunger assembly including a plunger stem and housing that define and are collinear with a plunger axis, said plunger stem being extendible into said one of said plurality of vertical uprights along said plunger axis for coupling with a selected one of said plurality of apertures of said strut.

8. The powered transport of claim 1, wherein said strut is one of a plurality of struts that support said handlebar assembly.

9. The powered transport of claim 1, wherein said mounting slot is one of a plurality of slots and said battery module is one of a plurality of battery modules, said plurality of slots for accommodating said plurality of said battery modules.

10. A method for retrofitting a telescoping gravity roller assembly with a powered transport of claim 1, comprising:
    providing the powered transport; and
    providing assembly instructions on a tangible, non-transient medium, said assembly instructions including:
    coupling said powered transport to a proximal end of a base roller ramp to suspend said base roller ramp between said powered transport and a pair of casters at a distal end of said base roller ramp.

11. The method of claim 10, wherein said assembly instructions provided in the step of providing assembly instructions includes:
    prior to the step of coupling said powered transport to said proximal end of said base roller ramp, removing a manually powered package stop and brake assembly from said proximal end of said base roller ramp.

12. The method of claim 10, wherein said assembly instructions provided in the step of providing assembly instructions includes, during the step of coupling said powered transport to said proximal end of said base roller ramp:
    aligning a first side rail mounting plate of said powered transport with a first side rail of said base roller ramp;

aligning a second side rail mounting plate of said powered transport with a second side rail of said base roller ramp;

registering said first side rail of said base roller ramp against a first bearing plate of said powered transport;

registering said second side rail of said base roller ramp against a second bearing plate of said powered transport; and fastening said first side rail and said second side rail of said base roller ramp to said first side rail mounting plate and said second side rail mounting plate, respectively.

13. A method of deploying a roller ramp assembly, comprising:

transporting a plurality of extension roller ramps to a deployment site with a powered transport of claim 1;

anchoring a distal-most of said extension roller ramps; and driving said powered transport away from said distal-most of said extension roller ramps to extend said plurality of extension roller ramps between said powered transport and said distal-most of said extension roller ramps.

14. The method of claim 13, wherein the step of anchoring includes one or more of locking a caster wheel supporting said distal-most of said extension roller ramps, chocking said caster wheel supporting said distal-most of said extension roller ramps, deploying a retractable anchor coupled to said distal-most of said extension roller ramps, and manually holding onto said distal-most of said extension roller ramps.

15. A powered dolly for transport and deploying an assembly of roller ramps, comprising:

a chassis including side members that extend axially and cross members that extend laterally;

a power drive operatively coupled to one of a pair of wheel assemblies, said power drive and said pair of wheel assemblies being mounted to said chassis;

a vertical package stop that extends vertically upward from said chassis, said vertical package stops including a plurality of vertical uprights;

a package rest mounted to said chassis and extending orthogonal to said vertical package stop;

a panel mounted to said vertical uprights, said panel including a stop portion affixed to a distal face of said vertical uprights and a base board portion that extends between said plurality of vertical uprights and is coupled to a proximal face of said vertical uprights, said base board portion of said panel defines a mounting slot providing access to a battery mount disposed within said base board;

a handlebar assembly including a cross bar supported by a strut that extends into one of said plurality of vertical uprights, said strut defining a plurality of apertures, said handlebar assembly including one or more handle grips coupled to said cross bar;

control boxes mounted to said handlebar assembly, said control boxes including a main power box and at least one motion control box, said at least one motion control box being operatively coupled to a control module for operation of said power drive;

a spring plunger assembly mounted to said one of said plurality of vertical uprights, said spring plunger assembly including a plunger stem and housing that define and are collinear with a plunger axis, said plunger stem being extendible into said one of said plurality of vertical uprights along said plunger axis for coupling with a selected one of said plurality of apertures of said strut;

one or more courtesy lights mounted to said base board;

a battery module including a core battery captured by a battery guard, said core battery being disposed through said mounting slot and seated on said battery support;

a voltage converter operatively coupled to said core battery; and a pair of skid plates and a pair of side rail mounting plates coupled to said chassis for coupling of a base roller ramp thereto.

16. The powered dolly of claim 15, wherein said strut is one of a plurality of struts that support said handlebar assembly.

17. The powered dolly of claim 15, wherein said slot is one of a plurality of slots and said battery module is one of a plurality of battery modules, said plurality of slots for accommodating said plurality of said battery modules.

* * * * *